Feb. 23, 1926.

R. B. WILLIAMSON

FLOW INDICATOR

Filed Jan. 2, 1920

Patented Feb. 23, 1926.

1,574,460

UNITED STATES PATENT OFFICE.

ROBERT B. WILLIAMSON, OF MILWAUKEE, WISCONSIN, ASSIGNOR TO ALLIS-CHALMERS MANUFACTURING COMPANY, OF MILWAUKEE, WISCONSIN, A CORPORATION OF DELAWARE.

FLOW INDICATOR.

Application filed January 2, 1920. Serial No. 349,655.

*To all whom it may concern:*

Be it known that ROBERT B. WILLIAMSON, a citizen of the United States of America, residing at Milwaukee, in the county of Milwaukee and State of Wisconsin, has invented a certain new and useful Improvement in Flow Indicators, of which the following is a specification.

This invention relates in general to apparatus for indicating in a visual manner, the presence or absence of flow of fluid through a conduit and has particular relation to apparatus of this general character of specific utility in connection with the indication of flow of lubricating fluid through a conduit of a lubricating system.

It is an object of this invention to provide an indicating apparatus of improved design which is of comparatively simple and inexpensive construction and of extreme utility in indicating the presence or absence of flow of fluid through a conduit.

It is a further object of this invention to provide an improved indicating apparatus of this general character which is of simple construction and design and of extreme utility in indicating not only the presence or absence of flow of fluid through a conduit with which the indicator is associated, but also for indicating, to a considerable extent, the rate of such flow.

It is a further object of this invention to provide an improved indicating apparatus of the general character described which is of comparatively simple construction and design and capable of indicating the flow of fluid in either direction through a conduit, and this independently of whether the conduit is disposed in a vertical, horizontal or inclined direction.

These and other objects and advantages are attained by this invention, the various novel features of which will appear from the description and drawings, disclosing one embodiment of this invention, and will be more particularly pointed out in the claims.

Figure 1:
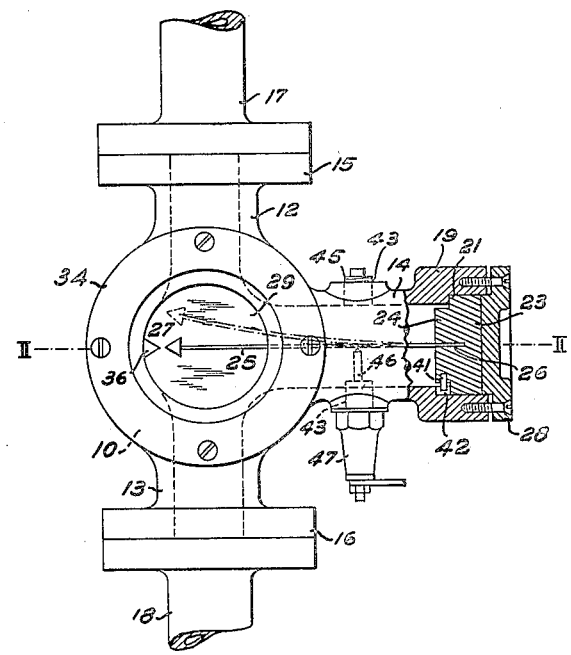
Fig. 1 is a longitudinal elevation of indicating apparatus embodying features of this invention, parts being broken away for the purpose of showing structural details.
Figure 2:
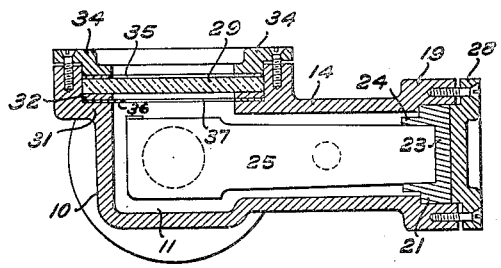
Fig. 2 is a horizontal sectional view taken along the line II—II of Fig. 1.

In the embodiment of the invention disclosed, a casing 10 is provided with a central recess 11, tubular extensions 12, 13 and 14 projecting from the central recessed portion. The tubular extensions 12 and 13 are in substantial alinement and are provided at their outer ends with coupling elements, here shown as integral flanged portions 15, 16, for connection to correspondingly flanged portions of sections of pipe 17, 18. Bolts, clamps or any suitable means may be used for connecting the flanges of the casing 10 and the adjacent pipe sections. Tubular extension 14 is provided at its outer end with an integral flange or enlargement 19, the latter being provided with an interior recess 21, as generally indicated in the drawings. A block or other element 23, preferably of the same shape in outline as the recess 21, is disposed in the recess, this block having an extension 24 projecting into the bore of the tubular extension 14.

A vane 25 of resilient sheet material is attached to a central portion of the block 23, preferably by being inserted within a slot 26 and brazed or otherwise secured therein. This resilient vane extends into the recess 11 of the casing almost to the opposite side thereof, and, as indicated in the drawings, it is of such size and shape as to lie in the general path of fluid passing from one of the tubular extensions 12, 13 to the other and to be readily deflected by the fluid, without offering too serious an impediment to the flow of such fluid. At its inner end, this vane is provided with a suitably formed indicating element 27, preferably in the form of an arrow-head with its point extending away from the supporting block 23. A clamping plate 28 holds the block 23 in operative position. This clamping plate may be secured in operative position by screws, as indicated, or by threading the same to the flange or enlargement 19 of the casing.

The open front of the casing is closed by a transparent sight glass 29 held in operative position against a shouldered portion 31 of the casing 10 through the intermediary of a flexible washer 32, the holding means being here indicated as a clamping collar 34 which is held in position, as by means of holding screws, as shown, a flexible washer 35 preferably being inserted between the sight glass 29 and the clamping collar 34 to distribute the pressure of the latter.

An indicating pointer or zero mark 36 is provided to cooperate with the arrow-head 27, the element 36 being formed preferably as a part of an apertured disk 37 which is held in position on the shouldered portion 31 of the casing. This indicating element 36 is intended to coincide with the indicating arrow 27 of the vane when the latter is in normal or neutral position, that is, the position corresponding to no-flow of fluid through the indicator casing.

A projecting pin 41 on the block 23 is cooperative with a slot 42 in the enlargement 10 to hold the block 23 and the vane 25 in proper position.

The tubular extension 14 of the casing may be provided with opposed threaded apertures 43 adapted to receive either plain closure studs 45 or an electric contact 46 mounted in an insulating bushing 47. This provision makes it possible, if the same is desirable, to have an indication of stoppage of flow through the indicator, the contact 46 being intended to engage the vane 25 to complete an alarm circuit only when the vane is in neutral or no-flow position. It will be apparent that the contact 46 may be disposed in either one of the apertures 43, depending upon the direction of flow through the indicator casing.

The indicating vane 25 is of such rigidity and is so mounted as to bias itself to and maintain itself in the normal or neutral position, shown in full lines in the drawing, under conditions of no-flow, independently of whether the vane is in a horizontal, vertical or inclined position, this being substantially equivalent to a statement to the effect that the same indicator casing may readily be connected in position between any two adjacent sections of the pipe line, and the indicator will be effective to indicate flow therethrough in either direction. As will be apparent, when there is a flow of fluid through the indicator casing, the pressure exerted by the fluid is such as to move the vane 25 to a greater or less extent in the direction of flow, as indicated in dotted lines in the drawing, thus giving an indication of the presence of flow, and, to a great extent, the volume of flow. On cessation of flow, the resilient indicator moves back to its neutral position.

It should be understood that it is not desired that the invention claimed be limited to the exact details of construction shown and described, for obvious modifications may occur to a person skilled in the art.

It is claimed and desired to secure by Letters Patent:

1. A flow indicator, comprising a casing having a flow opening therethrough, and a movable indicating element within said casing comprising a flexible resilient vane having a portion in the normal path of flow through said casing, said movable element being biased toward non-indicating position independently of the position of the casing and capable of being readily flexed to indicating position in response to flow of fluid through said casing.

2. A flow indicator, comprising a casing having a flow opening therethrough and a transparent window affording a view of the interior of the casing, and a movable indicating element having a part associated therewith visible through said window, said indicating element comprising a vane of resiliently yieldable material having a portion thereof in the normal path of flow through the casing, said vane being biased to neutral position independently of the position of said casing and capable of being flexed in either direction therefrom in response to flow of fluid through said casing.

3. A flow indicator, comprising a casing having a flow opening therethrough and a transparent window affording a view of the interior of the casing, a support removably held in position within the casing, a resiliently yieldable vane carried by said support and having a portion in the normal path of flow through the casing, said vane being biased to neutral position and capable of being flexed in either direction therefrom in response to flow of fluid through the casing, and said indicating element and said support being removable from said casing as a unit.

4. A flow indicator, comprising a casing having entrance and outlet openings permitting flow through the casing, and an additional opening therein, and a movable indicating element within said casing, said indicating element comprising a flexible vane of resilient material having a part associated therewith in the normal path of flow through the casing, said vane being biased to non-indicating position independently of the position of said casing and capable of being flexed therefrom in response to flow of fluid through the casing, and said indicating element being removable from and insertible in said casing through said additional opening.

5. A flow indicator, comprising a casing having entrance and outlet openings permitting flow through the casing and an additional opening therein having its axis at an angle to the path of flow through the casing, a transparent window in said casing affording a view of the interior thereof, a support mounted within said additional opening, and an indicating element having a part associated therewith visible through said window and comprising a resiliently yieldable vane having one end mounted in said support and a portion thereof extending into the normal path of flow through said entrance and outlet openings, said vane being biased toward non-indicating position independently of the position of said casing, and said support and said vane being removable from said casing through said additional opening.

6. A flow indicator, comprising a casing having a flow opening therethrough, an indicating element removably mounted in said casing and comprising a resiliently yieldable vane biased to non-indicating position and capable of flexure to indicating position in response to flow of fluid through the casing, and means comprising a part removably mounted in said casing and cooperable with said vane when the latter is in position corresponding to substantial cessation of flow through the casing to thereby enable a determination of such cessation of flow through the casing.

7. A flow indicator, comprising a casing having a flow opening therethrough, and a flexible, resilient vane having one portion fixed in position relative to said casing and a free portion in the normal path of flow through said casing, said vane being biased toward non-indicating position independently of the position occupied by said casing and capable of being flexed to indicating position in response to flow of fluid through said casing.

8. A flow indicator, comprising a casing having a flow opening therethrough, a supporting element detachably secured in said casing, and a flexible, resilient vane having one end secured to said supporting element and having a portion in the normal path of flow through said casing, said vane being biased to non-indicating position and capable of being flexed to indicating position in response to flow of fluid through said casing, and said supporting element and said vane being removable from said casing as a unit.

In testimony whereof, the signature of the inventor is affixed hereto.

ROBERT B. WILLIAMSON.